United States Patent
Uemura et al.

(10) Patent No.: US 10,363,718 B2
(45) Date of Patent: Jul. 30, 2019

(54) ADHESIVE SHEET AND ADHESIVE SHEET PRODUCTION METHOD

(71) Applicants: LINTEC CORPORATION, Itabashi-ku (JP); NIPPON PAINT INDUSTRIAL COATINGS CO., LTD., Shinagawa-ku (JP)

(72) Inventors: Kazue Uemura, Tsukubamirai (JP); Kiichiro Kato, Saitama (JP); Shigeru Saito, Ina-machi (JP); Yumiko Amino, Funabashi (JP); Masanori Kido, Suita (JP); Shinji Nishioka, Ota-ku (JP); Masato Kishi, Yokohama (JP)

(73) Assignees: LINTEC CORPORATION, Itabashi-ku (JP); NIPPON PAINT INDUSTRIAL COATINGS CO., LTD., Shinagawa-ku (JP)

( * ) Notice: Subject to any disclaimer, the term of this patent is extended or adjusted under 35 U.S.C. 154(b) by 55 days.

(21) Appl. No.: 15/129,950

(22) PCT Filed: Apr. 2, 2015

(86) PCT No.: PCT/JP2015/060411
§ 371 (c)(1),
(2) Date: Sep. 28, 2016

(87) PCT Pub. No.: WO2015/152345
PCT Pub. Date: Oct. 8, 2015

(65) Prior Publication Data
US 2017/0210085 A1    Jul. 27, 2017

(30) Foreign Application Priority Data
Apr. 2, 2014    (JP) .................................. 2014-076576

(51) Int. Cl.
*C08K 3/22*    (2006.01)
*C09J 133/08*    (2006.01)
(Continued)

(52) U.S. Cl.
CPC ............... *B32B 3/263* (2013.01); *B32B 3/00* (2013.01); *B32B 3/26* (2013.01); *B32B 7/00* (2013.01);
(Continued)

(58) Field of Classification Search
CPC ...... C09J 7/0217; C09J 11/04; C09J 2433/00; C09J 133/08; C09J 2205/102; C09J 7/02;
(Continued)

(56) References Cited

U.S. PATENT DOCUMENTS 6,294,250 B1 * 9/2001 Date ......................... C09J 7/50
428/353
9,240,131 B2 * 1/2016 Onderisin .............. B31D 1/027
(Continued)

FOREIGN PATENT DOCUMENTS

JP    59-90980 U    6/1984
JP    2-3481 A    1/1990
(Continued)

OTHER PUBLICATIONS

Extended European Search Report dated Dec. 15, 2016 in Patent Application No. 15772644.9.
(Continued)

*Primary Examiner* — Patricia L. Nordmeyer
(74) *Attorney, Agent, or Firm* — Oblon, McClelland, Maier & Neustadt, L.L.P.

(57) ABSTRACT

The present invention relates to a pressure sensitive adhesive sheet containing, laminated in this order, a supporting substrate, a pressure sensitive adhesive layer (X), a continuous void-containing layer including a composition containing fine particles (excepting silica), and a pressure sensitive adhesive layer (Y), the continuous void-containing layer having a mass concentration of the fine particles of from 45 to 100%.

18 Claims, 1 Drawing Sheet (51) Int. Cl.
| | |
|---|---|
| B32B 3/26 | (2006.01) |
| B32B 27/08 | (2006.01) |
| B32B 27/20 | (2006.01) |
| B32B 27/30 | (2006.01) |
| B32B 27/36 | (2006.01) |
| B32B 7/00 | (2019.01) |
| B32B 7/02 | (2019.01) |
| B32B 7/12 | (2006.01) |
| B32B 19/00 | (2006.01) |
| B32B 19/04 | (2006.01) |
| B32B 27/00 | (2006.01) |
| B32B 27/06 | (2006.01) |
| B32B 27/14 | (2006.01) |
| B32B 27/18 | (2006.01) |
| B32B 3/00 | (2006.01) |
| B32B 37/12 | (2006.01) |
| C09J 7/38 | (2018.01) |
| C09J 7/22 | (2018.01) |
| C09J 7/29 | (2018.01) |
| C08K 3/013 | (2018.01) |

(52) U.S. Cl.
CPC .......... *B32B 7/02* (2013.01); *B32B 7/12* (2013.01); *B32B 19/00* (2013.01); *B32B 19/04* (2013.01); *B32B 27/00* (2013.01); *B32B 27/06* (2013.01); *B32B 27/08* (2013.01); *B32B 27/14* (2013.01); *B32B 27/18* (2013.01); *B32B 27/20* (2013.01); *B32B 27/302* (2013.01); *B32B 27/308* (2013.01); *B32B 27/365* (2013.01); *B32B 37/12* (2013.01); *C09J 7/22* (2018.01); *C09J 7/29* (2018.01); *C09J 7/38* (2018.01); *B32B 2250/00* (2013.01); *B32B 2255/00* (2013.01); *B32B 2255/205* (2013.01); *B32B 2264/00* (2013.01); *B32B 2264/10* (2013.01); *B32B 2264/102* (2013.01); *B32B 2307/30* (2013.01); *B32B 2307/306* (2013.01); *B32B 2307/40* (2013.01); *B32B 2307/50* (2013.01); *B32B 2405/00* (2013.01); *B32B 2451/00* (2013.01); *C08K 3/013* (2018.01); *C08K 2003/2227* (2013.01); *C09J 2201/36* (2013.01); *C09J 2205/102* (2013.01); *C09J 2400/123* (2013.01); *C09J 2400/163* (2013.01); *C09J 2433/00* (2013.01); *C09J 2467/006* (2013.01)

(58) Field of Classification Search
CPC ... C09J 7/385; C09J 7/255; C09J 7/203; C09J 7/22; C09J 7/38; C09J 7/10; C09J 7/0207; C09J 7/0253; C09J 7/026; C09J 7/0285; C09J 7/20; C09J 5/00; C09J 201/00; C09J 2201/16; C09J 2201/28; C09J 2201/36; C09J 2201/606; C09J 2205/10; C09J 2205/114; C09J 2400/163; C09J 2421/00; C09J 2467/006; C09J 2475/00; C09J 2483/005; B05D 1/36; B05D 3/108; B05D 5/00; C08K 3/346; C08K 3/36; C08K 3/34; C08K 3/013; C08K 7/00; C08K 2201/003
See application file for complete search history.

(56) References Cited

U.S. PATENT DOCUMENTS

| | | |
|---|---|---|
| 2001/0031353 A1 | 10/2001 | Hannington |
| 2002/0140093 A1 | 10/2002 | Yamazaki et al. |
| 2003/0226640 A1 | 12/2003 | Yamazaki et al. |
| 2004/0012098 A1 | 1/2004 | Yamazaki et al. |
| 2007/0212964 A1* | 9/2007 | Massow ............... C08L 21/00 442/151 |
| 2010/0189993 A1 | 7/2010 | Mori et al. |
| 2013/0011670 A1* | 1/2013 | Tsubaki ............... C08L 23/283 428/353 |
| 2014/0205819 A1 | 7/2014 | Tomino |

FOREIGN PATENT DOCUMENTS

| | | |
|---|---|---|
| JP | 7-26215 A | 1/1995 |
| JP | 8-3521 A | 1/1996 |
| JP | 10-279900 A | 10/1998 |
| JP | 10-310754 A | 11/1998 |
| JP | 2001-335766 A | 12/2001 |
| JP | 2001-354745 A | 12/2001 |
| JP | 2003-531253 A | 10/2003 |
| JP | 2005-200499 A | 7/2005 |
| JP | 2012-87304 A | 5/2012 |
| JP | 1-115982 A | 10/2012 |
| JP | 2012-197332 A | 10/2012 |
| WO | WO 2013/031032 A1 | 3/2013 |
| WO | WO 2014/051106 A1 | 4/2014 |

OTHER PUBLICATIONS

International Search Report dated Jun. 30, 2015 in PCT/JP2015/060411, filed Apr. 2, 2015.

* cited by examiner

ADHESIVE SHEET AND ADHESIVE SHEET PRODUCTION METHOD

TECHNICAL FIELD

The present invention relates to a pressure sensitive adhesive sheet, and more specifically, relates to a blister resistant pressure sensitive adhesive sheet that, on attaching to a surface of various plastic molded articles, is suppressed in occurrence of blister, including lifting, and has a smooth surface of a supporting substrate providing an excellent appearance.

BACKGROUND ART

A pressure sensitive adhesive sheet containing a supporting substrate having coated thereon a pressure sensitive adhesive has been widely used in many fields due to the convenience thereof that the sheet can be easily attached to an adherend by pressing. In recent years, plastic molded articles are being used frequently corresponding to the demands, such as weight saving of products. Associated thereto, there is an increasing use of a pressure sensitive adhesive sheet for attaching to a plastic molded article. Examples of the plastic molded articles include those obtained by molding a resin, such as polycarbonate, polymethyl methacrylate, polystyrene, and ABS.

In the case where a pressure sensitive adhesive sheet (such as a pressure sensitive adhesive label) using a supporting substrate having gas barrier property is attached to the surface of the plastic molded article for such a purpose as decoration, there are cases where a gas is generated from the plastic molded article to form bubbles between the pressure sensitive adhesive sheet and the plastic molded article, which causes blister including lifting. The occurrence of blister impairs the appearance of the label, and the decorative function of the pressure sensitive adhesive sheet is significantly deteriorated.

For solving the problem, for example, PTL 1 describes, as a pressure sensitive adhesive composition, an acrylic pressure sensitive adhesive composition containing a copolymer obtained by radical polymerization of a (meth)acrylate ester, a copolymerizable carboxyl group-containing compound, and a tertiary amine having a vinyl group.

PTL 2 proposes a blister resistant pressure sensitive adhesive sheet using a pressure sensitive adhesive containing a copolymer containing an acrylate ester having an alkyl group having from 4 to 12 carbon atoms and from 0.1 to 10% by weight of a polar monomer, such as acrylic acid and 2-hydroxyethyl acrylate, to which an aziridine cross-linking agent is added.

PTL 3 describes a pressure sensitive adhesive sheet containing, as components forming a pressure sensitive adhesive layer, a pressure sensitive adhesive component and a curing component, which is an acrylic monomer or oligomer, but there are cases where the curing component impairs the cohesive strength of the pressure sensitive adhesive layer, and in the case where the curing component has poor compatibility with the pressure sensitive adhesive component, the pressure sensitive adhesive layer becomes cloudy.

PTL 4 describes a pressure sensitive adhesive composition containing a resin composition obtained by copolymerizing a (meth)acrylate ester having from 1 to 12 carbon atoms and a carboxyl group-containing unsaturated monomer, having the particular molecular weight, and a resin composition obtained by copolymerizing one kind or two or more kinds of a monomer selected from an alkyl methacrylate or cycloalkyl methacrylate having from 1 to 20 carbon atoms, benzyl methacrylate, and styrene, with an amino group-containing unsaturated monomer, having the particular glass transition temperature (Tg) and the particular molecular weight.

PTL 5 describes a blister resistant pressure sensitive adhesive composition containing a copolymer obtained by copolymerizing an alkyl (meth)acrylate having an alkyl group having from 1 to 12 carbon atoms as a major component, a styrene monomer, a carboxyl group-containing unsaturated monomer, and an amino group-containing unsaturated monomer, having the particular molecular weight, with which a cross-linking agent having a glycidyl group is mixed.

PTL 6 describes a resin composition obtained through polymerization in acetone, having a weight average molecular weight of 1,500,000 or more and a ratio (weight average molecular weight)/(number average molecular weight) of 4.0 or less.

CITATION LIST

Patent Literatures

PTL 1: JP-A-2-3481
PTL 2: JP-A-8-3521
PTL 3: JP-A-10-279900
PTL 4: JP-A-10-310754
PTL 5: JP-A-2001-335766
PTL 6: JP-A-2001-354745

SUMMARY OF INVENTION

Technical Problem

However, all the techniques described in PTLs 1 to 6 have problems that the composition, the species of the cross-linking agent, the molecular weight, and the like of the pressure sensitive adhesive are limited, the applicable pressure sensitive adhesive is limited, and it is difficult to achieve simultaneously both the pressure sensitive characteristics and the blister resistance, which are necessary for the purpose of labels.

Under the circumstances, an object of the present invention is to provide a pressure sensitive adhesive sheet that, on attaching to a surface of various plastic molded articles, is suppressed in occurrence of blister, including lifting, even after the lapse of time, has a smooth surface of a supporting substrate providing an excellent appearance, exhibits excellent blister resistance with any type of the pressure sensitive adhesive, and can be produced easily.

Solution to Problem

As a result of earnest investigations for solving the problem, the present inventors have found that the problems can be solved by a pressure sensitive adhesive sheet containing, laminated in this order, a supporting substrate, a pressure sensitive adhesive layer, a continuous void-containing layer containing a composition containing particular fine particles, and a pressure sensitive adhesive layer, in which the mass concentration of the fine particles in the continuous void-containing layer is in a particular range. The present invention has been completed based on the knowledge.

Accordingly, the present invention provides:

(1) a pressure sensitive adhesive sheet containing, laminated in this order, a supporting substrate, a pressure sensitive adhesive layer (X), a continuous void-containing layer including a composition containing fine particles (excepting silica), and a pressure sensitive adhesive layer (Y), the continuous void-containing layer having a mass concentration of the fine particles of from 45 to 100%, (2) the pressure sensitive adhesive sheet according to the item (1), wherein the continuous void-containing layer has a thickness incremental rate by voids of from 110 to 200%, (3) the pressure sensitive adhesive sheet according to the item (1) or (2), wherein the fine particles as a material forming the continuous void-containing layer are at least one selected from a metal oxide and smectite, (4) a method for producing the pressure sensitive adhesive sheet according to any one of the items (1) to (3) containing, laminated in this order, a supporting substrate, a pressure sensitive adhesive layer (X), a continuous void-containing layer, and a pressure sensitive adhesive layer (Y), the method containing simultaneously coating at least two layers of the pressure sensitive adhesive layer (X), the continuous void-containing layer, and the pressure sensitive adhesive layer (Y), with a multilayer coater, and (5) a method for producing the pressure sensitive adhesive sheet according to any one of the items (1) to (3) containing, laminated in this order, a supporting substrate, a pressure sensitive adhesive layer (X), a continuous void-containing layer, and a pressure sensitive adhesive layer (Y), the method containing laminating each of the pressure sensitive adhesive layer (X), the continuous void-containing layer, and the pressure sensitive adhesive layer (Y), by bonding.

Advantageous Effects of Invention

The pressure sensitive adhesive sheet of the present invention has a layer structure containing, laminated in this order, a supporting substrate, a pressure sensitive adhesive layer (X), a continuous void-containing layer containing a particular proportion of fine particles (excepting silica), and a pressure sensitive adhesive layer (Y), and thus such a pressure sensitive adhesive sheet can be provided that has a smooth surface of a supporting substrate excellent in appearance, exhibits excellent blister resistance with any type of the pressure sensitive adhesive, and can be produced easily.

DESCRIPTION OF EMBODIMENTS

The pressure sensitive adhesive sheet of the present invention will be described.

The pressure sensitive adhesive sheet of the present invention contains, laminated in this order, a supporting substrate, a pressure sensitive adhesive layer (X), a continuous void-containing layer including a composition containing fine particles (excepting silica), and a pressure sensitive adhesive layer (Y), and the continuous void-containing layer has a mass concentration of the fine particles of from 45 to 100%.

It suffices that the pressure sensitive adhesive sheet of the present invention contains the supporting substrate, the pressure sensitive adhesive layer (X), the continuous void-containing layer, pressure sensitive adhesive layer (Y) that are laminated in this order, and a layer containing the components constituting the layers mixed with each other at the interface between the layers (which may be hereinafter referred to as a "mixed layer") may be formed.

Examples of the mixed layer include a layer containing the components constituting two layers of the pressure sensitive adhesive layer (X) and the continuous void-containing layer mixed with each other, a layer containing the components constituting two layers of the continuous void-containing layer and the pressure sensitive adhesive layer (Y) mixed with each other, and a layer containing the components constituting three layers of the pressure sensitive adhesive layer (X), the continuous void-containing layer, and the pressure sensitive adhesive layer (Y) mixed with each other. Examples of the method for forming the mixed layer include a method of forming the pressure sensitive adhesive layer (X) or the continuous void-containing layer, and then forming the continuous void-containing layer or the pressure sensitive adhesive layer (Y) as an upper layer thereof by a so-called wet-on-wet or wet-on-dry process.

Supporting Substrate

The supporting substrate used in the pressure sensitive adhesive sheet of the present invention is not particularly limited, and various substrates that have been used as a supporting substrate of a pressure sensitive adhesive sheet may be used. Examples of the supporting substrate include a plastic film, for example, a polyester film, such as a polyethylene terephthalate film, a polybutylene terephthalate film, and a polyethylene naphthalate film, a polyethylene film, a polypropylene film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyphenylene sulfide film, a polyether imide film, a polyimide film, a fluorine resin film, a polyamide film, an acrylic resin film, a norbornene resin film, and a cycloolefin resin film.

Among these, a polyethylene terephthalate film is preferred. For a purpose that requires heat resistance or the like, a polyethylene naphthalate film, a polyimide film, and a polyether imide film, which have a high glass transition temperature (Tg), may be used. For a purpose that requires weather resistance or the like, a polyvinyl chloride film, a polyvinylidene chloride film, a fluorine resin film, and an acrylic resin film, which have weather resistance, may be used.

The thickness of the plastic film is not particularly limited, and is generally approximately from 5 to 200 μm, preferably from 25 to 120 μm, more preferably from 30 to 90 μm, and further preferably from 40 to 60 μm.

Metal Layer

The supporting substrate in the present invention is preferably a gas impermeable substrate, with which the suppression of blister, i.e., the advantageous effect of the present invention, can be more clearly exhibited.

The gas impermeable substrate used may be a substrate containing the aforementioned plastic film having thereon a metal layer. Examples of the method for forming the metal layer include a method of vapor-depositing a metal having metallic luster, specifically aluminum, tin, chromium, titanium, and the like, by a PVD method, such as vacuum vapor deposition, sputtering, and ion plating, and a method of bonding a metal foil having metallic luster, specifically an aluminum foil, a tin foil, a chromium foil, a titanium foil, and the like, through various kinds of a pressure sensitive adhesive layer generally used. In particular, the method of vapor-depositing a metal having metallic luster is advantageous from the standpoint of the appearance of the resulting pressure sensitive adhesive sheet and the economic efficiency.

The plastic film may be subjected to a surface treatment by an oxidation method, a roughening method, or the like, or a primer treatment, depending on necessity, for the purpose of the enhancement of the adhesiveness to the layer provided on the surface thereof. Examples of the oxidation method include a corona discharge treatment, a plasma discharge treatment, a chromic acid treatment (wet treatment), a hot air treatment, and an ozone or ultraviolet ray irradiation treatment, and examples of the roughening treatment include a sand blasting treatment and a solvent treatment. The surface treatment method may be appropriately selected corresponding to the kind of the plastic film, and a corona discharge treatment is generally preferably used from the standpoint of the effect, the handleability, and the like.

Continuous Void-Containing Layer

The continuous void-containing layer (which may be hereinafter referred simply to as a void-containing layer) constituting the pressure sensitive adhesive sheet of the present invention is a layer containing a composition containing fine particles (excepting silica), and the mass concentration of the fine particles in the void-containing layer is necessarily from 45 to 100%, preferably from 50 to 98%, more preferably from 55 to 95%, further preferably from 65 to 92%, and still further preferably from 70 to 90%. When the mass concentration of the fine particles is in the range, such a pressure sensitive adhesive sheet can be obtained that is suppressed in occurrence of blister, and has a smooth surface of the supporting substrate providing an excellent appearance.

The mass concentration of the fine particles in the void-containing layer can be calculated by the following expression (2). The total mass of the continuous void-containing layer means the total mass of the total solid content of the coating liquid for a continuous void-containing layer used for forming the continuous void-containing layer.

$$\text{mass concentration of fine particles} = (\text{mass of fine particles/total mass of continuous void-containing layer}) \times 100 \quad (2)$$

Thickness Incremental Rate by Voids

The thickness incremental rate of the void-containing layer by voids is preferably from 110 to 200%, more preferably from 120 to 190%, further preferably from 135 to 180%, and still further preferably from 140 to 170%.

The thickness incremental rate of the void-containing layer by voids that is in the range may facilitate the escape of the gas generated from the plastic molded article or the like, and thereby the pressure sensitive adhesive sheet may have excellent blister resistance and may be produced easily.

Calculation Method of Thickness Incremental Rate by Voids

The thickness incremental rate of the void-containing layer by voids can be calculated by the following manner.

The film thickness in the case where no void is contained is calculated by dividing the measured value of the coated amount by the specific gravity of the dried coated film (underlined part), and then the measured film thickness is divided by the film thickness in the case where no void is contained according to the following expression (1), thereby calculating the thickness incremental rate by voids.

$$\text{thickness incremental rate by voids (\%)} = \text{measured film thickness} \times 100/(\text{measured value of coated amount/specific gravity of dried coated film}) \quad (1)$$

The measured film thickness is the value obtained by measuring the thickness of the void-containing layer with a constant pressure thickness gauge ("PG-02", a product name, produced by Teclock Corporation) according to JIS K7130. The coated amount is the dry mass of the void-containing layer per unit area. The specific gravity of the dried coated film is the value calculated from the mass fractions of the specific gravity of the materials.

Voids

The fine particles as a material forming the continuous void-containing layer are actually constituted by primary particles and/or secondary particles. The voids in the continuous void-containing layer include voids present among the primary particles of the fine particles and voids present inside the secondary particles, and as for the secondary particles, the voids include not only voids present among the secondary particles, but also voids present inside the secondary particles. Therefore, the continuous void-containing layer has such a region that the void present among the secondary particles and the void present inside the secondary particles are connected to each other to form a cavity (fine pore), and also has such a region that the void present among the primary particles and the void present among the secondary particles and/or the void present inside the secondary particles are connected to each other to form a cavity (fine pore). These continuous voids form voids that are continuous in the thickness direction, thereby ensuring sufficient gas escaping paths, which prevent blister from occurring.

Fine Particles

The fine particles (excepting silica) used in the present invention are not particularly limited, as far as the fine particles can form the continuous void layer, and known fine particles can be used.

Examples of the fine particles include inorganic particles, such as a metal, a metal oxide, a mineral, calcium carbonate, magnesium carbonate, calcium sulfate, barium sulfate, aluminum hydroxide, aluminum silicate, calcium silicate, and magnesium silicate, and organic particles, such as acrylic beads.

The metal in the present invention means elements that belong to the 1 Group (excepting H), the 2 to 11 Groups, the 12 Group (excepting Hg), the 13 Group (excepting B), the 14 Group (excepting C and Si), the 15 Group (excepting N, P, As, and Sb), and the 16 Group (excepting O, S, Se, Te, and Po) in the periodic table.

Preferred specific examples of the metal oxide include alumina and boehmite.

Preferred specific examples of the mineral include smectite and bentonite.

Examples of the smectite include montmorillonite, beidellite, hectorite, saponite, stevensite, nontronite, and sauconite.

Among these fine particles, one or more selected from a metal oxide and smectite is preferred, one or more selected from alumina, boehmite, and smectite is more preferred, and one or more selected from alumina, boehmite, and hectorite is further preferred, from the standpoint of the blister resistance.

The median diameter of the fine particles (excepting silica) as a material forming the void-containing layer is preferably from 0.001 to 100 µm, more preferably from 0.05 to 25 µm, and further preferably from 0.1 to 10 µm. When the median diameter of the fine particles (excepting silica) is 0.001 µm or more, voids can be formed to such an extent that effective gas escaping property is obtained. When the median diameter of the fine particles (excepting silica) is 100 µm or less, the fine particles do not protrude from the void-containing layer, so as to stabilize the shape of the void-containing layer to such an extent that the pressure sensitive adhesive sheet is usable, thereby providing excellent handleability. The median diameter of the fine particles can be obtained by measuring the particle size distribution by the laser scattering method using a laser diffraction and scattering particle size distribution measuring instrument ("LA-920", a product name, produced by Horiba, Ltd.).

In the case where the fine particle as a material forming the void-containing layer is alumina, the median diameter thereof is preferably from 0.05 to 10 µm, more preferably from 0.1 to 5 µm, and further preferably from 0.3 to 3 µm.

In the case where the fine particle as a material forming the void-containing layer is boehmite, the median diameter thereof is preferably from 0.05 to 10 µm, more preferably from 0.1 to 8 µm, and further preferably from 0.3 to 7 µm.

In the case where the fine particle as a material forming the void-containing layer is smectite, the median diameter thereof is preferably from 0.001 to 100 µm, more preferably from 0.005 to 80 µm, and further preferably from 0.01 to 60 µm. In the case where the fine particles are smectite, the average length of the long edge of smectite is preferably from 0.002 to 100 µm, and more preferably from 0.01 to 80 µm. The average length of the short edge of smectite is preferably from 0.001 to 70 µm, and more preferably from 0.005 to 60 µm. In the sheet formed, smectite may be oriented in parallel to the plane direction of the sheet, and in this case, the median diameter thereof may be larger than the thickness of the pressure sensitive adhesive layer. The average aspect ratio (length of long edge (H)/length of short edge (L)) of smectite is preferably from 1.1 to 10, and more preferably from 1.3 to 3.

Two or more kinds of the fine particles may be used in combination.

Pressure Sensitive Adhesive

The continuous void-containing layer preferably contains a pressure sensitive adhesive as a component thereof, from the standpoint of the adhesiveness between the continuous void-containing layer and the pressure sensitive adhesive layer, and the standpoint that a substance having pressure sensitive adhesiveness tends to provide a larger adhesion force to an adherend as a result of the bulk influence thereof as compared to a substance having no pressure sensitive adhesiveness with the same thickness.

The pressure sensitive adhesive constituting the continuous void-containing layer is not particularly limited, and while various pressure sensitive adhesives, such as a rubber pressure sensitive adhesive, a silicone pressure sensitive adhesive, and an acrylic pressure sensitive adhesive, may be used, an acrylic pressure sensitive adhesive is preferred from the standpoint of the capability as a pressure sensitive adhesive, the weather resistance, and the like. The pressure sensitive adhesive may be any of a solvent type and an emulsion type. The solvent type pressure sensitive adhesive may contain a cross-linking agent depending on necessity.

Examples of the material constituting the acrylic pressure sensitive adhesive include a (co)polymer having a constitutional unit derived from an alkyl (meth)acrylate having a linear or branched alkyl group and a (co)polymer having a constitutional unit derived from an alkyl (meth)acrylate having a cyclic structure.

The (meth)acrylate means one or more selected from an acrylate and a methacrylate, and the (co)polymer means one or more selected from a polymer and a copolymer.

The acrylic pressure sensitive adhesive preferably contains as a pressure sensitive adhesive component a (meth) acrylate ester (co)polymer having a weight average molecular weight of from 100,000 to 1,500,000 and a cross-linking agent, and from the standpoint of the void ratio, the shear storage elastic modulus at 100° C. of the cross-linked pressure sensitive adhesive is preferably $9.0 \times 10^3$ Pa or more, more preferably $1.0 \times 10^4$ Pa or more, and further preferably $2.0 \times 10^4$ Pa or more. When the shear storage elastic modulus is $9.0 \times 10^3$ Pa or more, the voids can be retained to provide excellent blister resistance.

The shear storage elastic modulus can be obtained by measuring with a viscoelasticity measuring instrument (Dynamic Analyzer RDA II, a product name, produced by Rheometrics, Inc.) at a frequency of 1 Hz.

The pressure sensitive adhesive constituting the continuous void-containing layer and that used in the pressure sensitive adhesive layer described later are preferably the same as each other from the standpoint of the adhesiveness between the continuous void-containing layer and the pressure sensitive adhesive layer.

Examples of the cross-linking agent include a polyisocyanate compound, an epoxy resin, a melamine resin, a urea resin, a dialdehyde compound, a methylol polymer, an aziridine compound, a metal alkoxide, and a metal salt, and a polyisocyanate compound is preferably used. The cross-linking agent may be mixed in an amount of preferably from 0 to 30 parts by mass, more preferably from 0.01 to 15 parts by mass, further preferably from 0.5 to 10 parts by mass, and still further preferably from 2 to 7 parts by mass, per 100 parts by mass of the solid content of the (meth)acrylate ester (co)polymer.

Examples of the polyisocyanate compound include an aromatic polyisocyanate, such as tolylene diisocyanate, diphenylmethane diisocyanate, and xylylene diisocyanate, an aliphatic polyisocyanate, such as hexamethylene diisocyanate, an alicyclic polyisocyanate, such as isophorone diisocyanate and hydrogenated diphenylmethane diisocyanate, and a biuret thereof, an isocyanurate thereof, and an adduct thereof, which is a reaction product thereof with a low molecular weight active hydrogen-containing compound, such as ethylene glycol, propylene glycol, neopentyl glycol, trimethylolpropane, and castor oil. The cross-linking agent may be used solely or as a combination of two or more kinds thereof.

The acrylic pressure sensitive adhesive used in the present invention may contain a general additive in such a range that does not impair the advantageous effects of the present invention.

Examples of the general additive include a tackifier, an antioxidant, a softener (plasticizer), a filler, a rust preventing agent, a pigment, a dye, a retardant, a reaction accelerator, and an ultraviolet ray absorbent.

In the case where the general additive is contained, the content of each of the general additives is preferably from 0.0001 to 60 parts by mass, and more preferably from 0.001 to 50 parts by mass, per 100 parts by mass of the solid content of the pressure sensitive adhesive.

The thickness of the continuous void-containing layer is preferably from 5 to 100 µm, more preferably from 7 to 50 µm, further preferably from 10 to 30 µm, and still further preferably from 15 to 25 μm. When the thickness of the continuous void-containing layer is 5 μm or more, a thickness that is sufficient for embedding the fine particles can be ensured to form the continuous void-containing layer having less unevenness, and the blister resistance can be ensured. When the thickness of the continuous void-containing layer is 100 μm or less, the amount of the fine particles used can be suppressed, which is economically preferred.

The continuous void-containing layer may be formed by coating a coating liquid for the continuous void-containing layer containing the fine particles and the pressure sensitive adhesive, which is used depending on necessity.

Pressure Sensitive Adhesive Layers (X) and (Y)

Figure 1:
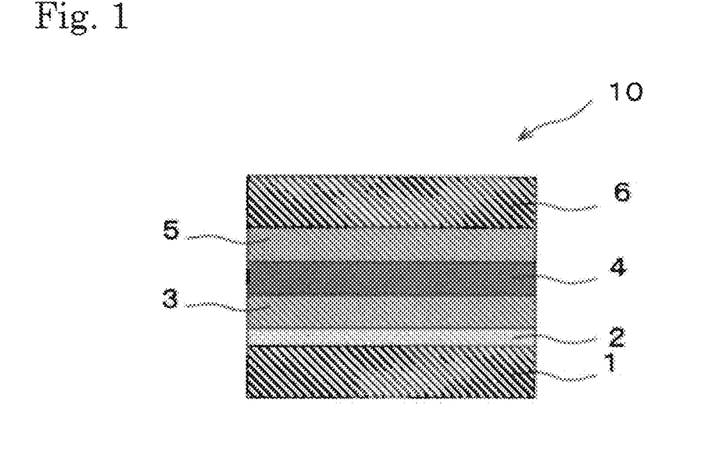
FIG. 1 is a schematic cross sectional view showing an example of the structure of the pressure sensitive adhesive sheet of the present invention.

FIG. 1 is a schematic cross sectional view showing an example of the structure of the pressure sensitive adhesive sheet of the present invention, and as shown in FIG. 1, the pressure sensitive adhesive sheet 10 of the present invention has a structure containing a supporting substrate 1 having a metal layer 2 on the surface thereof, having laminated in this order on the metal layer 2 a pressure sensitive adhesive layer (X) 3, the continuous void-containing layer 4, a pressure sensitive adhesive layer (Y) 5, and a release sheet 6.

In the pressure sensitive adhesive sheet of the present invention, the pressure sensitive adhesive constituting the pressure sensitive adhesive layer (X) and the pressure sensitive adhesive layer (Y) is not particularly limited since the pressure sensitive adhesive layers may not necessarily have a blister resistant function by themselves, and while various pressure sensitive adhesives, such as a rubber pressure sensitive adhesive, a silicone pressure sensitive adhesive, and an acrylic pressure sensitive adhesive, may be used, an acrylic pressure sensitive adhesive is preferred from the standpoint of the capability as a pressure sensitive adhesive, the weather resistance, and the like. The pressure sensitive adhesive may be any of a solvent type and an emulsion type. A cross-linking agent may be contained depending on necessity.

The thickness of the pressure sensitive adhesive layer (X) and the pressure sensitive adhesive layer (Y) in the pressure sensitive adhesive sheet of the present invention is preferably from 5 to 50 μm, more preferably from 7 to 35 μm, and further preferably from 10 to 30 μm.

The ratio of the thickness of the pressure sensitive adhesive layer (X) and the continuous void-containing layer (pressure sensitive adhesive layer (X)/continuous void-containing layer) is preferably from 0.05 to 10, more preferably from 0.1 to 5, further preferably from 0.2 to 2, and still further preferably from 0.3 to 0.8, from the standpoint of the achievement of both the excellent appearance and the blister resistance.

The ratio of the thickness of the pressure sensitive adhesive layer (Y) and the continuous void-containing layer (pressure sensitive adhesive layer (Y)/continuous void-containing layer) is preferably from 0.05 to 10, more preferably from 0.1 to 5, further preferably from 0.2 to 2, and still further preferably from 0.3 to 0.8, from the standpoint of the achievement of both the excellent appearance and the blister resistance.

The two pressure sensitive adhesive layers (X) and (Y) may have the same composition or different compositions. The compositions of the pressure sensitive adhesive layers are not particularly limited, and the same pressure sensitive adhesive as that used in the continuous void-containing layer may be used therefor.

The method for producing a pressure sensitive adhesive sheet of the present invention will be described.

Method I for producing Pressure Sensitive Adhesive Sheet

The method for producing a pressure sensitive adhesive sheet of the present invention is a method for producing a pressure sensitive adhesive sheet containing, laminated in this order, a supporting substrate, a pressure sensitive adhesive layer (X), a continuous void-containing layer, and a pressure sensitive adhesive layer (Y), and the method contains simultaneously coating at least two layers of the pressure sensitive adhesive layer (X), the continuous void-containing layer, and the pressure sensitive adhesive layer (Y), with a multilayer coater.

The layers to be simultaneously coated are at least two layers of the pressure sensitive adhesive layer (X), the continuous void-containing layer, and the pressure sensitive adhesive layer (Y) from the standpoint of the productivity, and it is preferred that the three layers, i.e., the pressure sensitive adhesive layer (X), the continuous void-containing layer, and the pressure sensitive adhesive layer (Y) are simultaneously coated.

In the simultaneous coating, the layers may be coated directly on the supporting substrate, or may be coated on a release-treated surface of a release sheet described later for protecting the pressure sensitive adhesive layers.

Examples of the coater as the multilayer coater for simultaneous coating in the production method I include a curtain coater and a die coater, and among these, a die coater is preferably used from the standpoint of the operationality.

Method II for producing Pressure Sensitive Adhesive Sheet

The method II for producing a pressure sensitive adhesive sheet of the present invention is a method for producing a pressure sensitive adhesive sheet containing, laminated in this order, a supporting substrate, a pressure sensitive adhesive layer (X), a continuous void-containing layer, and a pressure sensitive adhesive layer (Y), and the method contains laminating each of the pressure sensitive adhesive layer (X), the continuous void-containing layer, and the pressure sensitive adhesive layer (Y), by bonding.

Examples of the method of laminating by bonding in the production method II include such a method that the prescribed pressure sensitive adhesive is coated on a release-treated surface of a release sheet to a thickness after drying of preferably from 5 to 50 μm, more preferably from 7 to 35 μm, and further preferably from 10 to 30 μm, followed by drying, by a known method, so as to produce a pressure sensitive adhesive sheet having the release sheet, which is then adhered to the continuous void-containing layer by using a lamination roll.

Examples of the coater used for forming and coating the layers in the production method II include an air knife coater, a blade coater, a bar coater, a gravure coater, a roll coater, a roll knife coater, a curtain coater, a die coater, a knife coater, a screen coater, a Meyer bar coater, and a kiss coater, and among these, a roll knife coater and a die coater are preferred from the standpoint of the operationality. After forming and coating the layers, the layers are dried. The drying temperature is preferably from 35 to 200° C.

The following production method may also be used, i.e., a method for producing a pressure sensitive adhesive sheet containing, laminated in this order, a supporting substrate, a pressure sensitive adhesive layer (X), a continuous void-containing layer, and a pressure sensitive adhesive layer (Y), and the method contains laminating at least two layers of the pressure sensitive adhesive layer (X), the continuous void-containing layer, and the pressure sensitive adhesive layer (Y), by a so-called wet-on-wet or wet-on-dry process, which is not multilayer simultaneous coating.

The wet-on-wet process is, for example, a method of coating a coating liquid for forming the pressure sensitive adhesive layer (X), and without drying, further coating thereon a coating liquid for forming the continuous void-containing layer.

The wet-on-dry process is, for example, a method of coating a coating liquid for forming the pressure sensitive adhesive layer (X), coating thereon a coating liquid for forming the continuous void-containing layer, and then after drying, a coating liquid for forming the pressure sensitive adhesive layer (Y).

Such a method may also be used that a pressure sensitive adhesive sheet having laminated in this order the pressure sensitive adhesive layer (X), the continuous void-containing layer, and the pressure sensitive adhesive layer (Y), without a substrate is produced, and then the supporting substrate is laminated thereon. In this case, the pressure sensitive adhesive sheet without substrate may have a release sheet described later for protecting the pressure sensitive adhesive layers.

Release Sheet

Examples of the release sheet used in the method for producing a pressure sensitive adhesive sheet described above include a release sheet containing a film formed of various resins, such as polyethylene terephthalate, polybutylene terephthalate, polyethylene, polypropylene, and polyacrylate, or a paper material, such as polyethylene laminated paper, polypropylene laminated paper, clay coated paper, resin coated paper, glassine paper, and wood-free paper, as a substrate, in which the bonding surface of the substrate to the pressure sensitive adhesive layer is subjected to a release treatment depending on necessity.

Examples of the release treatment include formation of a release agent layer formed of a release agent, such as a silicone resin, a long-chain alkyl resin, and a fluorine resin. The thickness of the release sheet is not particularly limited, and is generally from 20 to 200 μm, preferably from 25 to 180 μm, and more preferably from 35 to 170 μm.

The pressure sensitive adhesive sheet of the invention thus produced may be attached to a plastic molded article, such as polycarbonate, polymethyl methacrylate, polystyrene, and an ABS resin, and effectively prevent blister from occurring.

EXAMPLES

The present invention will be described in more detail with reference to examples, but the present invention is not limited to the examples in any way.

The blister resistance of the pressure sensitive adhesive sheets obtained in the examples was evaluated by the following method.

Evaluation of Blister Resistance

The pressure sensitive adhesive sheet of 50 mm×50 mm, from which the release sheet had been removed, was attached to a polymethyl methacrylate plate of 70 mm×150 mm having a thickness of 2 mm ("Acrylite L001", produced by Mitsubishi Rayon Co., Ltd.) under pressure with a squeegee, which was allowed to stand at 23° C. for 12 hours, then allowed to stand in a hot air dryer at 80° C. for 1.5 hours, and then allowed to stand in a hot air dryer at 90° C. for 1.5 hours, and the occurrence status of blister after the heat acceleration was observed and evaluated under the following standard.

A: No blister was observed visually.
B: Blister was partially observed visually.
C: Blister was observed visually over the entire surface.

Measurement of Median Diameter of Fine Particles

The median diameter of the fine particles (excepting silica) as a material forming the continuous void-containing layer was obtained by measuring the particle size distribution by the laser scattering method using a laser diffraction and scattering particle size distribution measuring instrument ("LA-920", a product name, produced by Horiba, Ltd.).

Measurement of Thickness Incremental Rate and Mass Concentration of Fine Particles The thickness incremental rate by voids of the continuous void-containing layer and the mass concentration of the fine particles (excepting silica) were calculated by the expressions (1) and (2) described hereinabove, respectively.

Measurement of Film Thickness

The film thickness was obtained by measuring the thickness of the void-containing layer with a constant pressure thickness gauge ("PG-02", a product name, produced by Teclock Corporation) according to JIS K7130.

Example 1

Preparation of Coating Liquid (A) for Forming Pressure Sensitive Adhesive Layer

To 100 parts by mass of an acrylic resin solution (an acrylic copolymer containing butyl acrylate (hereinafter referred to as "BA") and acrylic acid (hereinafter referred to as "AA") (mass concentration ratio of BA and AA (BA/AA)=90/10 (% by mass)), weight average molecular weight (Mw): 470,000, solid concentration: 33.6% by mass, solvent: mixed solvent of toluene and ethyl acetate), 1 part by mass of an isocyanate cross-linking agent ("Coronate L", a trade name, produced by Nippon Polyurethane Co., Ltd., solid concentration: 75% by mass) (2.23 parts by mass of the solid content per 100 parts by mass of the acrylic copolymer) and ethyl acetate were added, so as to provide a coating liquid (A) for forming a pressure sensitive adhesive layer (solid concentration: 28% by mass).

Preparation of Coating Liquid (B) for Forming Continuous Void-Containing Layer

To 100 parts by mass of an acrylic resin solution (an acrylic copolymer containing BA and AA) (mass concentration ratio of BA and AA (BA/AA)=90/10 (% by mass)), weight average molecular weight (Mw): 470,000, solid concentration: 33.6% by mass, solvent: mixed solvent of toluene and ethyl acetate), 80.15 parts by mass of alumina particles ("AKP-3000", a trade name, produced by Sumitomo Chemical Co., Ltd., median diameter: 0.8 μm) as fine particles and toluene were added, and the alumina particles were dispersed in the acrylic resin solution, so as to provide an alumina-dispersed pressure sensitive adhesive composition (solid concentration: 37% by mass). Furthermore, 1 part by mass of an isocyanate cross-linking agent ("Coronate L", a trade name, produced by Nippon Polyurethane Co., Ltd., solid concentration: 75% by mass) (2.23 parts by mass of the solid content per 100 parts by mass of the acrylic copolymer) was added thereto, and toluene was further added thereto, so as to provide a coating liquid (B) for forming a continuous void-containing layer having a solid concentration of 22% by mass.

Production of Pressure Sensitive Adhesive Sheet

A polyethylene terephthalate film having an aluminum vapor deposition layer on one surface thereof ("FNS MATT N50", a product name, produced by Lintec Corporation, thickness: 50 μm) was used as a supporting substrate, and a release film ("SP-PET 381130", a product name, produced by Lintec Corporation, thickness: 38 μm) was used as a release sheet. On the release-treated surface of the release sheet, the coating liquid (A) for forming a pressure sensitive adhesive layer was coated to a dry thickness of 10 μm with a roll coater and dried at 100° C. for 2 minutes, and then bonded to the aluminum-vapor-deposited surface of the supporting substrate with a lamination roll, so as to provide a pressure sensitive adhesive sheet (I). On the release-treated surface of the release sheet provided separately from the above, the coating liquid (B) for forming a continuous void-containing layer was coated to a dry thickness of 20 μm with a roll coater and dried at 100° C. for 2 minutes, and then bonded to the surface of the pressure sensitive adhesive sheet (I) on the side having the dried film of the coating liquid (A) for forming a pressure sensitive adhesive layer with a lamination roll, so as to provide a pressure sensitive adhesive sheet (II). Furthermore, on the release-treated surface of the release sheet provided separately from the above, the coating liquid (A) for forming a pressure sensitive adhesive layer was coated to a dry thickness of 10 μm with a roll coater and dried at 100° C. for 2 minutes, and then bonded to the surface of the pressure sensitive adhesive sheet (II) on the side having the dried film of the coating liquid (B) for forming a continuous void-containing layer with a lamination roll, so as to provide a pressure sensitive adhesive sheet of Example 1.

The continuous void-containing layer had a mass concentration of the alumina particles of 70% and a thickness incremental rate by voids of 123%.

Examples 2 to 8 and Comparative Examples 2 and 3

Pressure sensitive adhesive sheets were produced in the same manner as in Example 1 except that the kind of the fine particles, the part by mass of the fine particles, and the mass concentration of the fine particles were changed to those described in Table 1.

The fine particles used were alumina, boehmite, and smectite shown below.

Alumina: "AKP-3000", a product name, produced by Sumitomo Chemical Co., Ltd., median diameter: 0.8 μm Boehmite: "DISPERAL 60", a product name, produced by Sasol, Ltd., median diameter: 6.1 μm Smectite: "Lucentite STN", a product name, produced by Co-op Chemical Co., Ltd., median diameter: 53.7 μm Example 9

A pressure sensitive adhesive sheet was produced in the same manner as in Example 8 except that three layers were simultaneously coated by using the coating liquid (A) for forming a pressure sensitive adhesive layer and the coating liquid (B) for forming a continuous void-containing layer with a multilayer die coater to make the pressure sensitive adhesive layer, the continuous void-containing layer, and the pressure sensitive adhesive layer in this order on the release-treated surface of the release sheet.

Comparative Example 1

On the release-treated surface of the release sheet "SP-PET 381130" (described above), the coating liquid (A) for forming a pressure sensitive adhesive layer was coated with a roll coater and dried at 100° C. for 1 minute to provide a pressure sensitive adhesive layer having a thickness of 40 μm, and then bonded to the aluminum-vapor-deposited surface of the supporting substrate "FNS MATT N50" (described above) with a lamination roll, so as to provide a pressure sensitive adhesive sheet.

The pressure sensitive adhesive layer of the pressure sensitive adhesive sheet had a mass concentration of fine particles of 0%.

The pressure sensitive adhesive sheets obtained in Examples and Comparative Examples were evaluated for the blister resistance. The results are shown in Table 1 along with the kind of the fine particles in the continuous void-containing layer, the mass concentration of the fine particles, and the thickness incremental rate by voids.

TABLE 1

| | Fine particles | | Mass concentration of fine particles (%) | Thickness incremental rate by voids (%) | Blister resistance On PMMA |
|---|---|---|---|---|---|
| | Kind | Part by mass | | | |
| Example 1 | alumina | 80.15 | 70 | 123 | B |
| Example 2 | alumina | 309.15 | 90 | 141 | A |
| Example 3 | boehmite | 80.15 | 70 | 132 | B |
| Example 4 | boehmite | 137.40 | 80 | 146 | A |
| Example 5 | boehmite | 309.15 | 90 | 160 | A |
| Example 6 | smectite | 34.35 | 50 | 111 | B |
| Example 7 | smectite | 80.15 | 70 | 142 | A |
| Example 8 | smectite | 309.15 | 90 | 178 | A |
| Example 9 | smectite | 309.15 | 90 | 178 | A |
| Comparative Example 1 | — | — | 0 | — | C |
| Comparative Example 2 | alumina | 22.90 | 40 | 100 | C |
| Comparative Example 3 | boehmite | 22.90 | 40 | 100 | C |

PMMA: polymethyl methacrylate

Figure 2:
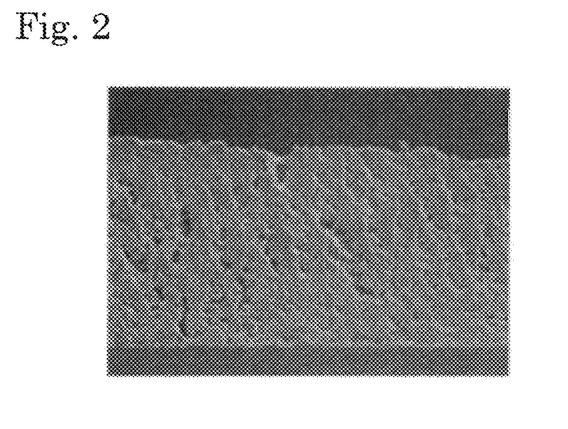
FIG. 2 is an electron micrograph of the cross section of the continuous void-containing layer formed in Example 4 (mass concentration of boehmite: 80%).

FIG. 2 shows an electron micrograph of the cross section of the continuous void-containing layer formed in Example 4 (mass concentration of boehmite: 80%).

Figure 3:
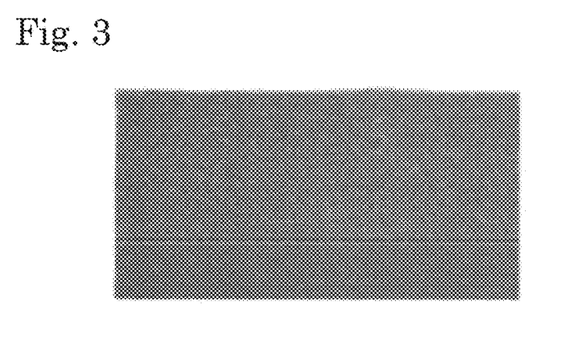
FIG. 3 is an electron micrograph of the cross section of the continuous void-containing layer formed in Comparative Example 3 (mass concentration of boehmite: 40%).

FIG. 3 shows an electron micrograph of the cross section of the continuous void-containing layer formed in Comparative Example 3 (mass concentration of boehmite: 40%).

In Example 4, continuous voids are formed, whereas in Comparative Example 3 (mass concentration of boehmite: 40%), no continuous void is formed.

The observation was performed by using a field-emission electron microscope "S-4700", produced by Hitachi, Ltd. at an acceleration voltage of 15 kV.

INDUSTRIAL APPLICABILITY

The pressure sensitive adhesive sheet of the present invention on attaching to a surface of various plastic molded articles is suppressed in occurrence of blister, including lifting, even after the lapse of time, has a smooth surface of a supporting substrate providing an excellent appearance, exhibits excellent blister resistance with any type of the pressure sensitive adhesive, and can be produced easily.

REFERENCE SIGNS LIST 1 supporting substrate
2 metal layer
3 pressure sensitive adhesive layer (X)
4 continuous void-containing layer
5 pressure sensitive adhesive layer (Y)
6 release sheet
10 pressure sensitive adhesive sheet

The invention claimed is:

1. A pressure sensitive adhesive sheet, comprising:
a supporting substrate;
a pressure sensitive adhesive layer (X) formed on the supporting substrate;
a continuous void-containing layer formed on the pressure sensitive adhesive layer (X) and including a composition comprising: fine particles which are not silica particles; and a pressure sensitive adhesive; and
a pressure sensitive adhesive layer (Y) formed on the continuous void-containing layer,
wherein a median diameter of the fine particles is from 0.001 to 100 μm,
voids present among the fine particles form continuous voids included in the continuous void-containing layer, and
the continuous void-containing layer has a mass concentration of the fine particles of from 45 to 100%,
wherein the pressure sensitive adhesive in the continuous void-containing layer is at least one selected from the group consisting of a rubber pressure sensitive adhesive, a silicone pressure sensitive adhesive, and an acrylic pressure sensitive adhesive.

2. The pressure sensitive adhesive sheet according to claim 1, wherein the continuous void-containing layer has a thickness incremental rate by voids of from 110 to 200%.

3. The pressure sensitive adhesive sheet according to claim 1, wherein the fine particles are at least one selected from the group consisting of a metal oxide and smectite.

4. A method for producing the pressure sensitive adhesive sheet according to claim 1, the method comprising simultaneously coating at least two layers of the pressure sensitive adhesive layer (X), the continuous void-containing layer, and the second pressure sensitive adhesive layer (Y), with a multilayer coater.

5. A method for producing the pressure sensitive adhesive sheet according to claim 1, the method comprising laminating each of the pressure sensitive adhesive layer (X), the continuous void-containing layer, and the second pressure sensitive adhesive layer (Y), by bonding.

6. The pressure sensitive adhesive sheet according to claim 1, wherein the fine particles are at least one selected from the group consisting of alumina, boehmite, and smectite.

7. The pressure sensitive adhesive sheet according to claim 1, wherein the fine particles are at least one selected from the group consisting of alumina, boehmite, and hectorite.

8. The pressure sensitive adhesive sheet according to claim 1, wherein the pressure sensitive adhesive in the continuous void-containing layer is an acrylic pressure sensitive adhesive.

9. The pressure sensitive adhesive sheet according to claim 1, wherein a thickness of the continuous void-containing layer is from 5 to 100 μm.

10. The pressure sensitive adhesive sheet according to claim 1, wherein a thickness of the continuous void-containing layer is from 10 to 30 μm.

11. The pressure sensitive adhesive sheet according to claim 1, wherein a thickness of the continuous void-containing layer is from 15 to 25 μm.

12. The pressure sensitive adhesive sheet according to claim 1, wherein the support substrate comprises a plastic film.

13. The pressure sensitive adhesive sheet according to claim 12, wherein the plastic film is at least one selected from the group consisting of a polyethylene terephthalate film, a polybutylene terephthalate film, and a polyethylene naphthalate film, a polyethylene film, a polypropylene film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyphenylene sulfide film, a polyether imide film, a polyimide film, a fluorine resin film, a polyamide film, an acrylic resin film, a norbornene resin film, and a cycloolefin resin film.

14. The pressure sensitive adhesive sheet according to claim 12, wherein the support substrate further comprises a metal layer provided on the plastic film.

15. The pressure sensitive adhesive sheet according to claim 14, wherein the metal layer comprises at least one selected from the group consisting of aluminum, tin, chromium, and titanium.

16. The pressure sensitive adhesive sheet according to claim 1, wherein the continuous void-containing layer has the mass concentration of the fine particles of from 50 to 98%.

17. The pressure sensitive adhesive sheet according to claim 1, wherein the continuous void-containing layer has the mass concentration of the fine particles of from 55 to 95%.

18. The pressure sensitive adhesive sheet according to claim 1, wherein the continuous void-containing layer has the mass concentration of the fine particles of from 70 to 90%.

* * * * *